United States Patent [19]

Miller et al.

[11] 3,936,569

[45] Feb. 3, 1976

[54] METALS COATED WITH 3,3,3-TRIFLUORO-2-TRIFLUOROMETHYL PROPENE/VINYLIDENE FLUORIDE COPOLYMER COMPOSITIONS

[75] Inventors: William A. Miller, Somerville; Brian W. Robinson, Chester, both of N.J.

[73] Assignee: Allied Chemical Corporation, New York, N.Y.

[22] Filed: Dec. 12, 1973

[21] Appl. No.: 424,031

[52] U.S. Cl. .............. 428/339; 427/185; 427/195; 427/292; 427/318; 428/421; 428/463
[51] Int. Cl.² .................. B32B 15/08; B32B 27/30
[58] Field of Search... 117/132 CF, 161 UF, 161 UH; 260/42.27, 45.7 R; 428/339, 421, 463; 427/185, 195

[56] References Cited
UNITED STATES PATENTS

| | | |
|---|---|---|
| 2,075,251 | 3/1937 | Winkelman................... 117/161 UF |
| 2,979,418 | 4/1961 | Dipner........................... 117/161 UF |
| 3,655,426 | 4/1972 | Fuchs............................ 117/132 CF |
| 3,706,723 | 12/1972 | Chandrasekaran et al.. 260/42.27 X |

*Primary Examiner*—Harry J. Gwinnell
*Attorney, Agent, or Firm*—Roger H. Criss; Michael S. Jarosz

[57] ABSTRACT

A coated article is provided which comprises a metal substrate and an overlying layer of a composition comprising a copolymer of 3,3,3-trifluoro-2-trifluoromethyl propene and vinylidene fluoride and an effective amount of a stabilizing agent. More particularly, the stabilizing agent is present in an amount of at least about 0.2 percent by weight based upon the weight of the copolymer and is selected from the group consisting of the oxides and salts of divalent meatls and mixtures thereof. Preferably, the thickness of the coating on the metal substrate is at least about 1 mil.

9 Claims, No Drawings

METALS COATED WITH 3,3,3-TRIFLUORO-2-TRIFLUOROMETHYL PROPENE/VINYLIDENE FLUORIDE COPOLYMER COMPOSITIONS

BACKGROUND OF THE INVENTION

1. Field of the Invention

This invention relates to coated articles and processes therefor, more particularly to articles coated with a copolymer of 3,3,3-trifluoro-2-trifluoromethyl propene and vinylidene fluoride.

2. Discussion of the Prior Art

Coating compositions of fluoropolymers, such as those based on polytetrafluoroethylene, have been used for some time to provide non-stick and protective surfaces on substrates, especially metal substrates. For example, cookware (such as frying pans, etc.), steam iron sole plates, industrial drier rollers and other articles have been coated with polytetrafluoroethylene compositions and have met with great acceptance by consumers and industry. However, such coated articles are susceptible to scratching and abrasion and hence the coated surfaces must be handled carefully. Moreover, it is necessary in the commercial production of coated cookware to utilize a primer coat of the grit type on the metal substrate prior to coating with the fluoropolymer. It would be desirable if metal substrates could be provided with a fluoropolymer surface that is abrasion and scratch resistant and does not require an intermediate primer coat.

Copolymers based on 3,3,3-trifluoro-2-trifluoromethyl propene and vinylidene fluoride are described in U.S. Pat. No. 3,706,723 to Chandrasekaran et al. Such copolymers have high melting points, good thermal stability and are resistant to attack by corrosive agents. U.S. Pat. No. 3,706,723 describes such copolymers as suitable for making a wide variety of useful products, such as coatings (e.g., protective coatings). However, it has been found that when such copolymers are coated on a metal substrate in relatively thick layers by a powder coating technique and allowed to "flow out" at elevated temperatures, surface microcracks in the coating layer appear. Surface defects such as microcracks are especially undesirable in coatings which are intended to afford protection from corrosive agents as well as in the other areas of use.

SUMMARY OF THE INVENTION

According to the present invention, a coated article is provided which comprises a metal substrate and an overlying layer of a composition comprising a copolymer of 3,3,3-trifluoro-2-trifluoromethyl propene and vinylidene fluoride and an effective amount of a stabilizing agent. More particularly, the stabilizing agent is present in an amount of at least about 0.2 percent by weight based upon the weight of the copolymer and is selected from the group consisting of the oxides and salts of divalent metals and mixtures thereof. Preferably, the thickness of the coating on the metal substrate is at least about 1 mil as is discussed more fully below. The coated articles do not require an intermediate primer layer so that the overlying layer directly contacts the substrate. However, primer layers may be employed if desired.

DESCRIPTION OF THE PREFERRED EMBODIMENTS

Copolymers of 3,3,3-trifluoro-2-trifluoromethyl propene and vinylidene fluoride and their preparation are fully described in the aforementioned U.S. Pat. No. 3,706,723, the disclosure of which is expressly incorporated herein. The copolymers may be prepared by copolymerizing 3,3,3-trifluoro-2-trifluoromethyl propene and vinylidene fluoride monomers by contacting the monomers in a suitable liquid polymerization medium in the presence of a free radical generating polymerization initiator. The copolymers generally contain from about 1 to about 55 mol percent of 3,3,3-trifluoro-2-trifluoromethyl propene, preferably from about 10 to about 52 mol percent of the propene and more preferably from about 40 to about 51 mol percent, and corresponding mol percentages of vinylidene fluoride. About equimolar copolymers of 3,3,3-trifluoro-2-trifluoromethyl propene and vinylidene fluoride are especially preferred.

Stabilizing agents which are incorporated in the coatings of this invention are selected from the group consisting of the oxides and salts of divalent metals and mixtures thereof. Such stabilizing agents are disclosed in commonly assigned patent application of Chandrasekaran and Sawhney, Ser. No. 424,032 filed Dec. 12, 1973. As disclosed therein, stabilizers include the oxides and salts of the metals of Group II of the Periodic Table as well as lead, tin, and manganese. Preferred stabilizers are calcium oxide, magnesium oxide, barium oxide, zinc oxide, cadmium oxide, lead oxide and calcium sulfate. The stabilizers are present in the coating composition preferably in an amount of at least about 0.20 percent by weight of the copolymer, preferably up to a maximum of about 30 weight percent and more preferably between about 1 and 3 percent by weight. Preparation of stabilized compositions is disclosed in the aforementioned application of Chandrasekaran and Sawhney and conventional additives such as inert fillers, lubricants, pigments, reinforcing agents and the like may be included therein.

The stabilized copolymer compositions are preferably in a powder form and any of the well-known powder coating techniques may be employed to coat the compositions onto metal substrates. These techniques include electrostatic deposition, fluidized bed and plasma or flame spray techniques. As these methods are conventional they are not specifically described herein. It is preferred to use an electrostatic deposition coating process. As is well known, this process provides initial adherence of a powder composition to a substrate and the substrate is thereafter subjected to a heat treatment above the melting point of the powder to fuse or coalesce ("flow out") the particles of the powder into a continuous layer. In forming the coated articles of this invention, it is preferred to employ flow out temperatures in the range of about 620° to 680°F., preferably 630° to 660°F. The duration of this heating step is dependent upon a number of factors, including the temperature employed, the coating thickness, the type of substrate, etc. In general, flow out times may conveniently be in the order of 1 or 2 minutes to 1 or 2 hours or more.

The type of metal employed as the base layer is not critical and is generally dictated by the desired end use of the coated article. Indeed, any metal may be employed for this purpose. Especially preferred substrates are those formed of aluminum and stainless steel. Likewise, the thickness of the metal substrate is not critical and is dependent upon design factors.

It is preferred to pretreat the metal substrate prior to coating to obtain a roughened surface which it is believed results in a stronger adherence of the coating to the substrate. Any suitable surface treatment can be employed for this purpose such as sand or grit blasting, etching, etc.

The coating itself may be deposited upon the substrate in any desired thickness. However, it has been found that particularly advantageous results are obtained with coatings of the stabilized copolymer composition which are of a thickness of at least about 1 mil. At thicknesses in this range, the stabilized copolymer coatings are much superior to unstabilized copolymer coatings in their surface appearance. It has been found that at thicknesses of about 1 mil and above unstabilized copolymer coatings exhibit a multiplicity of surface microcracks. These defects would preclude certain important applications of the coated articles, such as their use as protective linings for corrosive agents as well as antistick coatings. On the other hand, at thicknesses of about 1 mil and above, stabilized copolymer coatings do not exhibit such surface defects.

In forming thick coatings (e.g. 1 mil or above) it is desirable to employ a plurality of thin layers as is conventional in order to improve the uniformity and integrity of the coating. This of course requires additional exposure of the underlying coatings to high temperatures. It has been found that when employing this technique with unstabilized copolymer compositions, surface microcracking also occurs whereas again the surface of coatings formed from stabilized copolymer compositions are virtually defect-free.

Metal substrates coated according to this invention have coated surfaces which are continuous and pinhole-free. The coatings may be employed as protective as well as antistick surfaces. Examplary of articles which may be coated with the stabilized copolymers according to this invention are cookware, industrial tubing, pipes and tanks, steam iron sole plates and drier rollers as well as other articles which require coatings having high strength at elevated temperatures, resistance to chemical attack, good electrical insulating properties, non-sticking surfaces, and abrasion and scratch resistance.

EXAMPLE 1

Aluminum panels (4 inches × 4 inches × 0.081 inch thick) are sand blasted on both surfaces with 60 grit aluminum oxide. The panels are placed in an electrostatic deposition coating apparatus and are coated on both sides with two powder compositions of an equimolar copolymer of 3,3,3-trifluoro-2-trifluoromethyl propene and vinylidene fluoride having a melting point of 620°F. One powder composition (Composition A) contains no stabilizer and the other composition (Composition B) contains 2% CaO by weight of the copolymer. The particle size of the powders ranges from 5 to 50 microns.

The panels are vertically supported at one corner in a hot air oven maintained at 650°F. The panels remain in the oven for 15 minutes to permit the copolymer compositions to flow out into a continuous layer.

The panel coated with Composition A (unstabilized) has a coating which varies in thickness from 0.5 mil adjacent the supported corner to 3 mils at the opposite corner. Inspection of the panel with a magnifier reveals small surface cracks in areas where the coating had a thickness of about 1 mil and above. The panel coated with Composition B (stabilized) has a coating which varies in thickness from 0.5 mil adjacent the supported corner to 3 mils at the opposite corner. Similar inspection of this panel reveals no surface cracks.

EXAMPLE 2

Example 1 is repeated except that the panels are given two coatings of the powder compositions. After the first coating, the panels are supported in the oven at 650°F. for 30 minutes. The panels are removed from the oven and cooled in air for about 5 minutes. A second coating of powder is then applied and the panels are again supported in the oven for 30 minutes at 650°F.

The panel coated with Composition A (unstabilized) has a coating which varies in thickness from 0.5 to 3.5 mils. Surface cracks are present at thicknesses of about 1 mil and above. In comparison, the panel coated with Composition B (stabilized), which has a coating thickness which varies from 0.5 to 4 mils, does not exhibit surface cracks.

EXAMPLE 3

An aluminum panel 2 inches × 3½ inches × 0.081 inch thick is sandblasted on one side and heated in an oven to 780°F. The panel is taken out of the oven and dipped immediately into a fluidized bed of a composition of an equimolar copolymer of 3,3,3-trifluoro-2-trifluoromethyl propene and vinylidene fluoride and 2% CaO by weight of the copolymer. After dipping, the panel is placed in another air oven heated to 650°F. for a period of 15 minutes to allow the copolymer to flow out. The resultant coated panel has a coating thickness between about 0.003 and 0.005 inch. The coating is continuous and pinhole free.

A pencil hardness of 8H is required to scratch the coating. In comparison, a frypan coated with a polytetrafluoroethylene composition has a pencil hardness of 2H.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A coated article comprising a metal substrate having an overlying layer coated directly thereon comprising a copolymer of 3,3,3-trifluoro-2-trifluoromethyl propene and vinylidene fluoride and an effective amount of a stabilizing agent to prevent surface microcracks in said overlying layer, said stabilizing agent being selected from the group consisting of the oxides and salts of divalent metals and mixtures thereof and said overlying layer having a thickness of at least about one mil.

2. The coated article of claim 1 wherein said stabilizing agent is present in an amount of at least about 0.2 percent by weight of the copolymer.

3. The coated article of claim 1 wherein said stabilizing agent is selected from the group consisting of oxides and sulfates of a metal of Group II of the Periodic Table.

4. The coated article of claim 3 wherein said stabilizing agent is present in an amount of about 1 to about 3 percent by weight of the copolymer.

5. The coated article of claim 3 wherein said copolymer contains from about 1 to about 55 mol percent of 3,3,3-trifluoro-2-trifluoromethyl propene and correspondingly from about 99 to about 45 mol percent of vinylidene fluoride.

6. The coated article of claim 5 wherein said metal substrate has a roughened surface.

7. The coated article of claim 6 wherein said metal substrate is selected from the group consisting of aluminum and stainless steel.

8. The coated article of claim 1 wherein said copolymer is an equimolar copolymer of 3,3,3-trifluoro-2-trifluoromethyl propene and vinylidene fluoride.

9. The coated article of claim 8 wherein said stabilizer is calcium oxide.

* * * * *